United States Patent
Brand et al.

(10) Patent No.: US 10,362,792 B1
(45) Date of Patent: Jul. 30, 2019

(54) APPARATUS FOR STUFFING CONFECTIONS

(71) Applicants: Derek Roger Brand, Carpinteria, CA (US); Kenneth John Brand, Camarillo, CA (US); Maria Claudia Sarmiento, North Bay Village, FL (US); Adriana Molina, North Bay Village, FL (US)

(72) Inventors: Derek Roger Brand, Carpinteria, CA (US); Kenneth John Brand, Camarillo, CA (US); Maria Claudia Sarmiento, North Bay Village, FL (US); Adriana Molina, North Bay Village, FL (US)

( * ) Notice: Subject to any disclaimer, the term of this patent is extended or adjusted under 35 U.S.C. 154(b) by 753 days.

(21) Appl. No.: 14/508,638

(22) Filed: Oct. 7, 2014

(51) Int. Cl.
 *A23G 3/20* (2006.01)

(52) U.S. Cl.
 CPC ................... *A23G 3/2007* (2013.01)

(58) Field of Classification Search
 CPC ...... A23G 3/2007; A23G 3/20; A23G 3/2015; A23G 3/2023; A23G 3/2038; A23G 3/2046; A23G 3/2053; A23G 3/2061; A23G 3/2069
 USPC ............................................. 99/494; 425/383
 See application file for complete search history.

(56) References Cited

U.S. PATENT DOCUMENTS

| | | | | |
|---|---|---|---|---|
| 2,664,054 A | * | 12/1953 | Galvin | A21C 15/007 99/450.8 |
| 3,113,530 A | * | 12/1963 | Vestermark | A21C 15/007 221/225 |
| 3,264,685 A | * | 8/1966 | Boggild | A63H 33/001 29/434 |
| 3,583,336 A | * | 6/1971 | Vallerga | A21C 15/007 99/450.8 |
| 3,871,274 A | * | 3/1975 | Hornby | A21C 9/065 141/329 |
| 4,076,476 A | * | 2/1978 | Ventura | A63H 33/001 425/183 |
| 4,084,494 A | * | 4/1978 | Ezaki | A21C 9/04 118/21 |
| 4,669,967 A | * | 6/1987 | Hayashi | B30B 11/265 222/309 |
| 4,703,688 A | * | 11/1987 | Ochs | A21C 15/007 99/450.4 |
| 4,752,488 A | * | 6/1988 | Hayashi | A21C 15/007 425/131.1 |
| 5,409,364 A | * | 4/1995 | Schultheis | A63H 33/001 249/102 |

(Continued)

*Primary Examiner* — Christopher S Kim

(57) ABSTRACT

An apparatus for stuffing confection is structured to have a base member and an enclosure connected to the base member and disposed and dimensioned to receive a confection therein. The base member has a plurality of pockets and enables the enclosure to be secured within its dimensions. A cap assembly is structured in a communicating relation with a hollow interior of the enclosure. The removable cap assembly is structured to retain the stuffing material. An injection member has an injection piston movable relative to the cap assembly in a driving relation to the stuffing material. The driving relation of the injection piston with the stuffing material causes the stuffing material to be forced from the cap assembly into the confection retained within the hollow interior of said enclosure. The enclosure has wall members in a surrounding relation to the interior of the enclosure and at least partially defines the interior.

36 Claims, 6 Drawing Sheets

(56) References Cited

U.S. PATENT DOCUMENTS

| | | | | |
|---|---|---|---|---|
| 6,602,066 | B1* | 8/2003 | Heayes | A63H 33/32 |
| | | | | 425/131.1 |
| 7,195,793 | B1* | 3/2007 | Adair | A21B 5/00 |
| | | | | 426/279 |
| 7,275,924 | B1* | 10/2007 | Kreuzer | B29C 47/0002 |
| | | | | 425/169 |
| 7,681,494 | B2* | 3/2010 | Backus | A23B 4/32 |
| | | | | 99/345 |
| 2005/0087079 | A1* | 4/2005 | Graham | A21C 15/007 |
| | | | | 99/532 |
| 2016/0029665 | A1* | 2/2016 | Jensen | B65B 39/12 |
| | | | | 426/92 |

* cited by examiner

APPARATUS FOR STUFFING CONFECTIONS

BACKGROUND OF THE INVENTION

Field of the Invention

This invention is directed to an apparatus for stuffing material, and more particularly an apparatus for stuffing confections and other related goods considered collectively.

Description of the Related Art

Confections are food items that are generally rich in sugar (sucrose). Confections can be generally allocated into two categories, namely, baker's confectionary and sugar confectionary. Bakers' confectionery includes sweet baked goods, including the ones that are served in a dessert course. They are sweet foods that feature flour as a main ingredient and are usually baked. Major categories in baker's confectionary include cakes, cookies, pies, sweet breads, muffins, bread puddings, scones, biscotti, sweet pastries and doughnuts. Sugar confections include sugar-based or sugar/gelatin-based foods, which are usually eaten as snack food. Major categories in sugar confectionary include candy bars, lollipops, candy floss, jellies, pastilles, marshmallows, fondant, creams, chocolates, toffees, caramels, sugar tablets, candied fruits and nuts, chewing gum, and sometimes ice cream. Lately, there has been an unprecedented demand in the confectionary market for more artisan based confections. Typically, these artisan based confections come in array of creative and delicious flavors. They include confections that are artificially flavored, stuffed, combined, textured and crafted in various shapes and sizes. The variations are also available in myriad forms, toppings, appearances, palates, stuffings and assortments.

Confectioners and consumers alike, desire a variety of confectionary stuffings. Confectioners prefer them because it allows them to be creative and expand the confectionary market. Consumers demand them because the variety allows them to have preferable choices relative to the palates and occasions at which they can be served. The preferred variety of stuffings may include, but are not limited, to chocolate chips, sprinkles, toasted nuts, caramels, jellies, jams, candied fruits, cocoa, marmalades, honey, syrups, powdered sweets, fudges, curds, cereals, cheeses, compotes, zests, cookie crumbs, cremes, butters, truffles, fondues, licorice, brittle, gummies, sours, gum balls and a plethora of other concoctions.

The art of stuffing confectionery is not a scientific industry, as these products are traditionally created by skilled confectioners working empirically. However, many of the artisans use conventional ways combined with less than state of the art apparatus to stuff confections. Some of these may include melting, cutting, prodding, infringing, stabbing, injecting or physically pressing the desired stuffing into confections, or pieces thereof. These imperfect operative ways to stuff confections can prove to be time consuming, cumbersome, inconsistent, restrictive, and more often than not, jeopardize the intended palate, structure, presentation, edibility and integrity of the confection and the stuffing alike. Inconveniences in stuffing prevents confectioners to expand their market causing them to lose potential profits. They also prohibit consumers to have adequate choices based on occasions and events at which they can be served or eaten.

Moreover, in situations where there is a need to stuff confections with an assortment of products, the skilled confectioners may be succumbed to use overabundance of apparatuses to achieve desired stuffing for the intended confectionary. This proves to be highly restrictive, unimaginative, revenue cutting, time consuming and frustrating for the skilled confectioners.

Also, in situations where there is a need to stuff confections in in a high volume operation, the skilled confectioners have to dedicate an inordinate amount of time to achieve consistent results while attempting to eliminate the impediments. In summary, the present invention seeks to address such problems and others associated with stuffing confections.

Accordingly, there is a need in this area for an apparatus that is capable of being used with a wide array of confectionary and with an assortment of stuffings. There is also a need for an apparatus that aids confectioners to stuff confectionary consistently at a high speed, high volume, low cost, high efficiency, less space consuming and creative result yielding, without jeopardizing their creativity and market share. Likewise, there is a need for an apparatus that is capable in meeting the growing demand of the consuming public by permitting various combinations of confections based on consumption and venue they will be served.

Finally, if such an apparatus was developed, it would ideally be structured and operatively reliable. While still remaining relatively easy to operate and cost effective to make and assemble, it would facilitate widespread use and acceptance throughout the confectionary stuffing profession.

SUMMARY OF THE INVENTION

The invention is intended to present a solution to these and other needs which remain in the relevant field of art, and as such, at least one preferred embodiment is directed to an apparatus or assembly for stuffing confections with any one or more of a variety of stuffing materials. For purposes of clarity, in describing the structural and operative features, reference will be made to a base member and an enclosure. The enclosure is connected to the base member and has dimensions to receive and accommodate a confection. The apparatus also comprises a plurality of wall members that are positioned to surround the enclosure and are structured to at least partially define a hollow interior of the enclosure on the base member. More specifically, at least one of the wall members is movable and is connected to the base member such that the wall member can be positioned into and out of the surrounding relation to the hollow interior of the enclosure. Furthermore, the wall members can also be at least partially concave with respect to one another to correspond to a confectionary like a marshmallow. The wall members can also be shaped in other geometric forms, where confectionaries of variety of shapes like cookies, candy bars, cakes, and muffins can also be stuffed. Similarly, the hollow interior of the enclosure can comprise of various dimensions, depending at least in part on the position of the movable wall member relative to the interior of the enclosure. So, as a way of example, as one of the wall members is moved by the user, the hollow interior of the enclosure is either broadened or narrowed, to help it proportionally house a larger or smaller confectionary therein.

The apparatus of the present invention further comprises of a plurality of pockets. The plurality of pockets are structured on the base member extending at least partially there-through. More specifically, the pockets extend so as to add a depth dimension, which helps the user of the apparatus house the enclosure of the wall members into the pocket with relative ease. Furthermore, the plurality of pockets include a single open end and are structured to facilitate a removable receipt and connection with the wall members. This enables the user to secure the enclosure of the wall members. Accordingly, securing the enclosure allows the enclosure to receive a confectionary without having the confectionary fall out of place or having to jeopardize its integrity during the stuffing process. So, a user of the apparatus will be able to snap on the wall members securing the enclosure within the pocket on the base member. Alternatively, this permits the user to use a wide range of confectionary and stuffing material by changing the diameter of the enclosure to correspond to the size of the confection desired and/or to ensure an optimal fit or flavor. For example, a larger diameter pocket can be utilized for finer or more concentrated stuffing materials, or a more subtle addition.

Furthermore, the plurality of pockets are structured so that the wall members having the enclosure can be optionally threaded, pushed, snapped on, glued or secured to the plurality of pockets. Additionally, the dimensions of each pocket can be changed allowing the user of the apparatus to adjust the pocket size to properly correspond with the enclosure size of the wall members. The user may also choose to have the dimensions of the pocket remain fixed, so as to limit the flexibility of the size between the enclosure of the wall members and the pocket in order to have the preference of stuffing material to a particular confectionary only.

Moreover, the apparatus of the present invention also comprises a cap assembly and an injection member. The cap assembly is disposed in a communicating relationship with the hollow interior of the enclosure. More specifically, the cap assembly is secured on top of the hollow interior of the wall members. So, when the cap assembly is secured on the enclosure of the wall members, the hollow interior can be sealed off by the cap assembly. The sealing of the hollow interior ensures that the confectionary is safely retained within the hollow interior of the enclosure of the wall members. However, alternatively, the cap assembly is removable from its secured position with the wall members. In this instance, the secured position enables the cap assembly to attach in an affixed relation with the plurality of wall members as desired by the user. The user is therefore able to prevent any spilling or overflow that may incur due to overstuffing of the material into the confectionary not anticipated by the user. Furthermore, the cap assembly can be affixed with the wall members on a correspondingly dimensioned and configured enclosure. This ensures that the cap assembly is secured tightly, so as to help the user prevent any opening of the wall members to eliminate any spilling or improper stuffing of the material. Therefore, in terms of securing, the cap assembly is structured, so that it can be locked in with the wall members having the enclosure by either threading, screwing, pushing, gluing, welding or snapping on or securing in other known ways. To further emphasize this merely as a way of example, the cap assembly can be glued on with no desire to be removed, thus ensuring the user does not have to bear with the inconvenience of constant maintenance of multiple parts, which can be lost or misplaced. On the other hand, by the way of mere example, the cap assembly can be temporarily threaded on to the wall members by the user with a complete intention to be removed, so that the user can not only remove the confection from the enclosure of the wall members, but also personalize each confectionary with appropriate stuffing material and allow the user to use the apparatus with confectionaries of different fit or texture.

Furthermore, the cap assembly also comprises a disc member and a housing member, both the disc member and the housing member having an integral, one-piece construction in a preferred embodiment. The one-piece construction allows the user to maintain the integrity of the apparatus more easily by not having to assemble or dissemble the cap assembly and avoid loss of additional parts. Alternatively, the disc member and the housing member can also be featured as a separate multi-piece construction. The multi-piece construction allows the user to interchangeably adapt the cap assembly with various dimensions of the enclosure when confectionaries of different fit or flavor are used. Additionally, the housing member of the cap assembly includes a compartment structured for containment of the stuffing material. The compartment can be structured with various forms and dimensions. This allows the user to have more options, and thus, customize the confectionary with various types of stuffing as per the occasion. Moreover, when in an operative position, the compartment is disposed in a communicating relationship with the enclosure. This relationship allows the stuffing material to pass through the compartment and stuff into the confectionary without any reservations. Merely as a way of example, when the user stuffs the compartment with the stuffing material, the compartment is so structured as to allow the user to effectively force the stuffing material into the confectionary stationed below in the enclosure.

Alternatively, when the cap assembly is a one-piece construction with the wall members or is glued on with the desire to be removed, the hollow interior of the enclosure can be accessed by the user via the compartment of the cap assembly. This affixed feature allows the user, who prefers limited confectionary options, to not have to deal with multiple parts especially in a fast paced assembly line type of commercial setting. This essentially allows the user to stuff confectionaries of same type on a larger, commercial scale while avoiding unnecessary customization or having to worry about loss or misplaced parts. Similarly, the compartment can be of various dimensions, layered, grooved and contain valves. This assortment of forms allows the users to introduce confectionaries having different texture or rigidity. For instance, having a compartment of various dimensions can help the user deploy stuffing material in a confectionary that may be larger or smaller in structure. Furthermore, having valves or grooves can change the quantity and timing of the stuffing material to be stuffed by effectuating intervals or friction in delivery of the stuffing material in the confectionary.

Moreover, the cap assembly further comprises of a funnel member and a housing member, the funnel member and the housing member comprising an integral, one-piece construction. As an alternate feature, the funnel member and the housing member can also be in a multi-piece configuration allowing the user to avoid maintenance, loss or misplacement of multiple parts. More specifically, the particular shape of the funnel member facilitates an easy, spill-proof way of filling the stuffing material into the compartment of the cap assembly. As elaborated in earlier embodiment of the cap assembly, the customization of dimensions of the compartment provides the user with similar benefits and improvements. Additionally, the dimensions of the funnel member can be of various measurements as well. This allows the user to customize the confectionary with stuffing material of various types, forms and fits. The stuffing material can also be introduced into the compartment of the housing member via the funnel member of the cap assembly. The introduction can effectively be manual or automated allowing the user to have options depending on the occasion and setting. Also, when introduced, an injection member of the apparatus facilitates the stuffing aspect of the stuffing material with the confectionary via the funnel member and the housing member of the cap assembly.

Additionally, the cap assembly of the present invention comprises of a housing member, a compartment and a disc member, where the length of the compartment substantially exceeds the length of the housing member. In this context, substantially greater length means that the length of the compartment is greater than the length of the housing member and disc member collectively such that that the length of the compartment is visibly longer than that of the housing member and the disc member. Accordingly, the extended length of the compartment defines a protruding characteristic that effectively impregnates into the confectionary contained in the enclosure below, once the user has placed the confectionary in the enclosure, and secured the cap assembly on the plurality of wall members therewith. More specifically, the protruding length of the compartment allows the user to stuff the stuffing material into the confectionary with relative ease because the impregnation caused by the protruding length of the compartment creates an aperture or void in the confectionary. Accordingly, the protruding compartment manages to pierce itself into the deeper confines of the confectionary permitting the stuffing material to readily fill into the confectionary as the user introduces the stuffing material into the compartment. As this remains, the greater length of the compartment enables the user to easily fill the stuffing material into the confectionary due to the impregnated area of the confectionary created therein.

Furthermore, the injection member of the apparatus comprises of a lever handle and an injection piston. The injection piston is movable relative to the cap assembly. The injection piston and the compartment of the housing member are cooperatively dimensioned to facilitate a passage of the injection piston into the compartment in a driving relation to the stuffing material. More particularly, the user can facilitate a driving motion of the injection member by gripping the lever handle of the injection member and driving the injection member in the direction of the confectionary. Therefore, this essentially effectuates a driving motion towards the stuffing material prefilled in the compartment of the housing member of the cap assembly. Accordingly, the motion allows the injection piston of the injection member to facilitate a passage into the compartment in a driving relation by forcing the stuffing material contained in the compartment of the housing member to be stuffed into the confectionary, positioned within the hollow interior of the enclosure. The driving relation of the injection member can be manual and automated and is not limited to one particular driving motion. For instance, the injection member and the injection piston therein, are not limited to one range of driving motion, thus allowing the user to have the flexibility in deciding the preferred motion when dealing with a limited space or commercial setting. The driving motion examples may include, and are limited to variables such as a specific pull, push, length, degree, force, dexterity or torque. Again, these choices vary based on the setting the apparatus can be used.

The injection member further comprises of a gripping member structured to help the user facilitate a proper driving relation. For instance, the gripping member allows the user to negotiate an easy grip of the injection member, and thus, facilitate a driving motion with an appropriate force, velocity, direction or angle as desired by the user. Furthermore, the injection piston can comprise of various dimensions and can be made of different materials. Having an injection piston of larger or smaller diameter allows the user to effectively force the stuffing material stored in the compartment of the housing member having a corresponding dimension as the injection piston. This is because a larger diameter of the injection piston would not help effectuate effective stuffing if the diameter of the housing member were to be smaller. Therefore, the variety in sizes of the injection member is necessary for the user to properly effectuate the stuffing contained in the correspondingly sized diameter of the housing member. Additionally, the injection member can be also hollow, solid, partially hollow or solid in its structure. The options allow the user to more readily force the injection piston into a preferred stuffing material or confectionary with relative ease and efficiency. The injection member can also have a length that is equal to the compartment, longer than the compartment or enough to facilitate a successful driving motion of the stuffing material. The assortment of length choices of the injection piston allows the user to stuff the stuffing material completely into the confectionary with relative efficiency. Thus, if the user prefers to increase or decrease the length of compartment, a corresponding length of the injection piston would help the user with effectively stuffing all the material into the confectionary and customized the variety and amount of stuffing. Furthermore, the injection piston can be removed from the injection member, but as an alternate, can also be a one-piece construction with the injection member. The options allows the user to either eliminate the need to have multiple parts. On the other hand, it allows another user to remain limited in the options as best suited for fast paced, commercial setting, where customization is less likely to be important. The injection piston can be smooth, but can also have grooves, scales and dimples to negotiate with any type of stuffing material. For instance, the variance in the structure of the injection piston can allow the user to effectively stuff an assortment of material like nuts, candy, chocolate chips or syrup into confectionaries with ease. Also, a relatively rigid textured confectionary made out of gelatin may require a grooved injection piston to effectively impregnate the integrity of the confectionary rather than a smooth one.

Furthermore, the injection member can be in a snap on relation with the base member as an option to the user. More specifically, the user can snap the injection member to be snapped on to the base member. This allows the user to assemble the injection member when the apparatus is in use or disassemble it while in storage. Alternatively, the injection member can also be threaded, fractioned, glued or affixed in various other methods to the base member. The alternate options helps the user use the apparatus in various personal or commercial settings.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
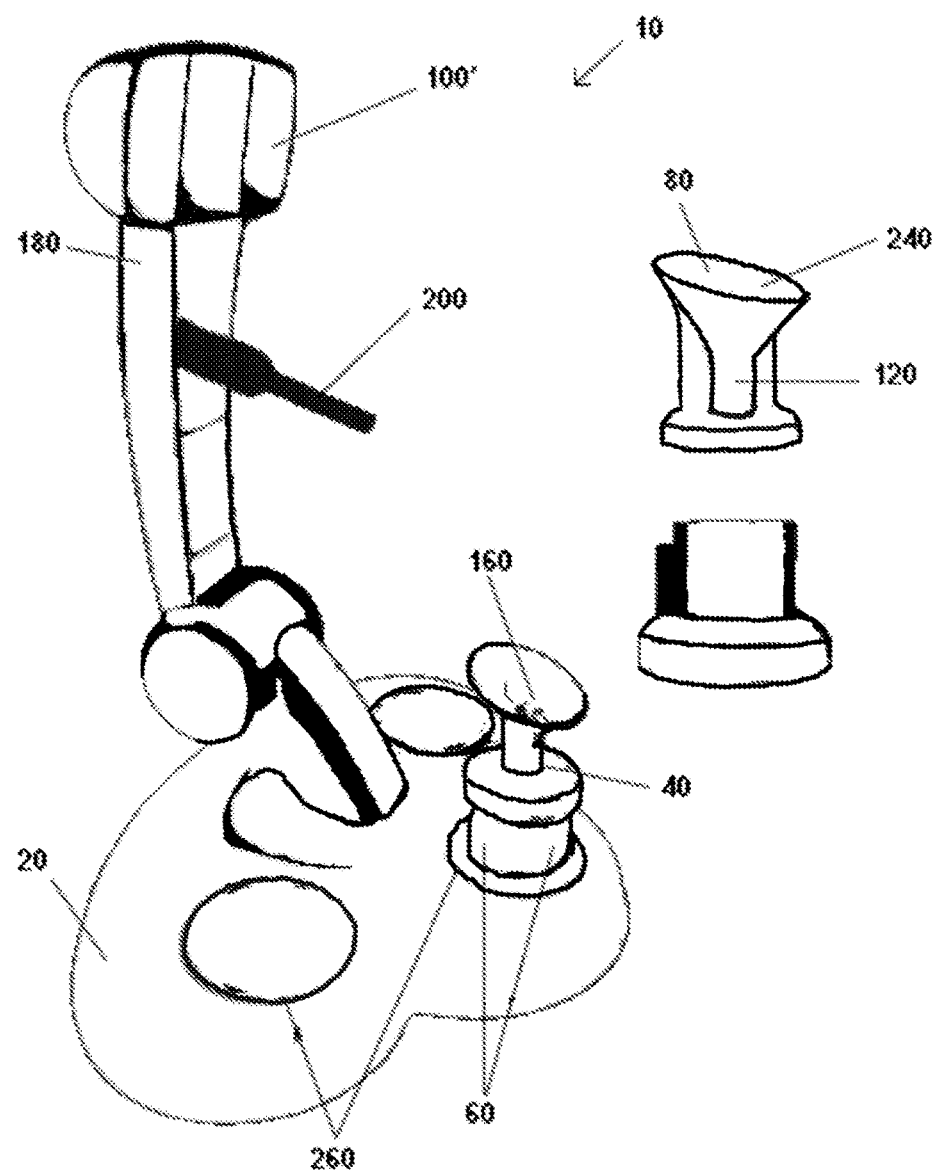
FIG. 1 is a perspective view of an embodiment of the apparatus for stuffing confections according to the present invention.
Figure 5:
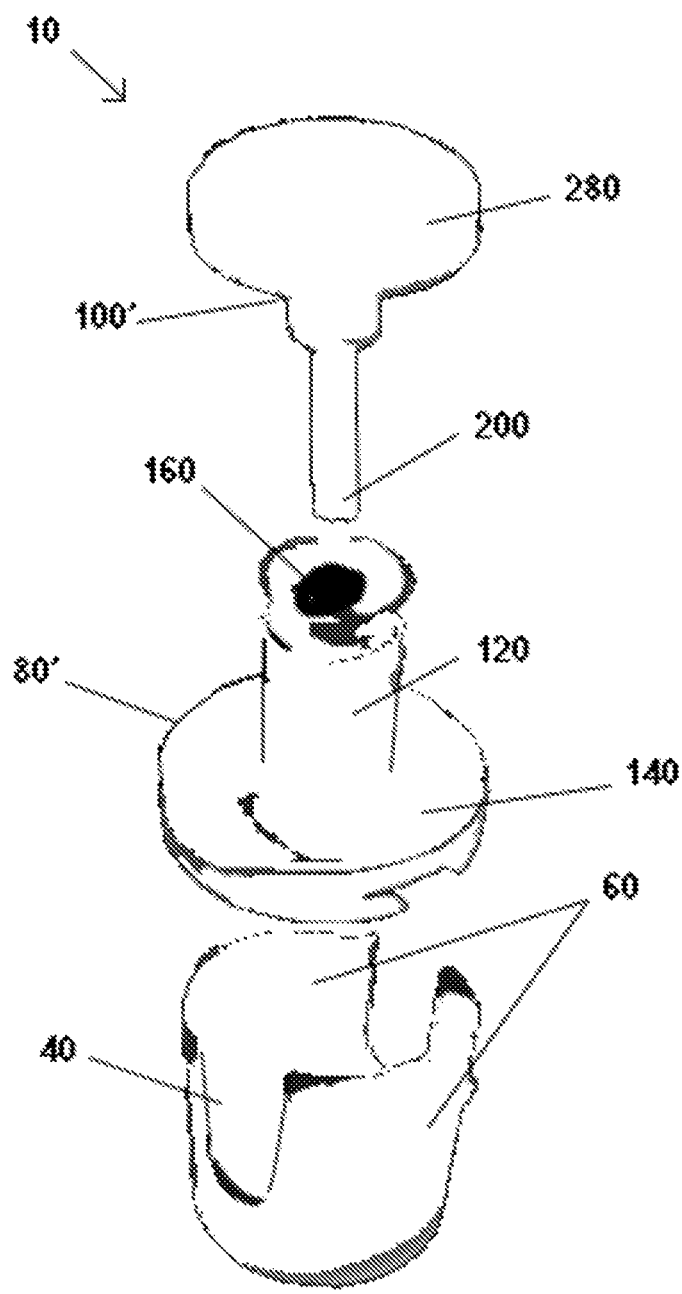
FIG. 5 is a perspective exploded view of yet another embodiment of the apparatus for stuffing confections of the present invention with a gripping member and a plurality of rigid wall members, but without a base member.
Figure 6:
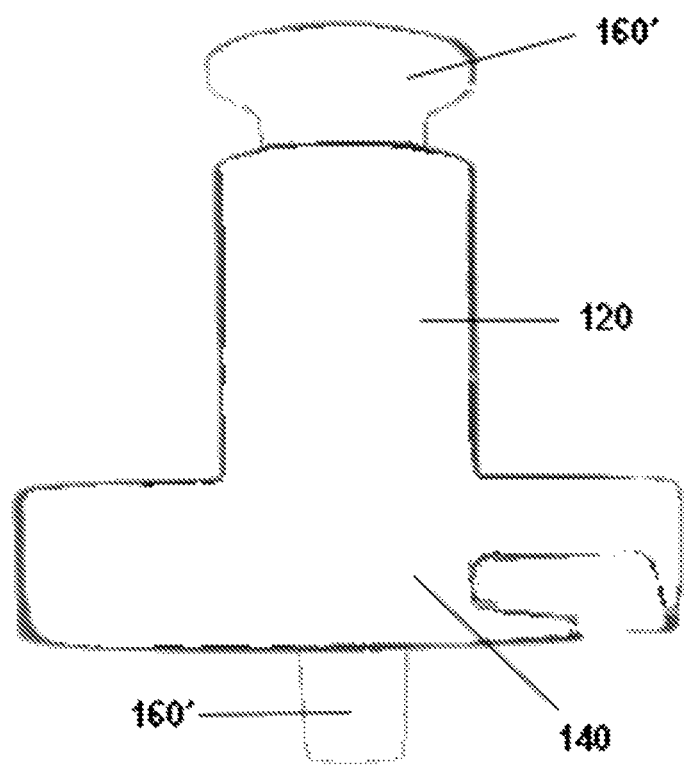
FIG. 6 is a detailed view of the cap assembly having a housing member, a compartment and a disc member, where the length of the compartment is longer than the housing member, extending past the disc member.

With reference to FIG. 1, the present invention is directed to apparatus for stuffing confections and is generally indicated as 10. As such, the apparatus 10 comprises of a base member 20 and an enclosure 40. The base member 20 can be of various geometric shapes. The base member 20 can also be structured to store a plurality of confections within its dimensions. The base member 20 can be plastic, metal and like materials. As an alternate embodiment, as seen in FIG. 5, the apparatus of the present invention can be without a base member 20 as a stand-alone. In another instance, the enclosure 40 is movably connected to the base member 20, at least in part and is dimensioned to removably receive and accommodate a confection therein. More specifically, the enclosure 40 comprises at least one but preferably a plurality of wall members 60. When the enclosure 40 comprises a plurality of the aforementioned wall members 60 they are collectively positioned to surround the enclosure 40 and are structured to at least partially define a hollow interior of the enclosure 40 on the base member 20. At least one of the wall members 60, as at 60' is movably connected to the base member 20, such that the wall member 60' can be positioned into and out of the surrounding relation to the hollow interior of the enclosure 40. As a result, the dimension and/or configuration of the hollow interior of the enclosure 40 is variable so as to accommodate confections of different sizes, textures and shapes. In another embodiment, at least one of the wall members 60 can also be removably connected to the base member 20, such that the wall member 60 can be positioned in and out of the surrounding relation to the hollow interior of the enclosure 40. As a result, the dimension and/or configuration of the hollow interior of the enclosure 40 is static so as to accommodate confection of a specific size, texture and shape only. In addition, one or more of the wall members 60 can also have a substantially concave interior surface with respect to the hollow interior of the enclosure 40, so as to further accommodate a secure but removable retention of confections having different sizes and shapes. However, the interior of one or more of the wall members 60 is not limited and can be of numerous geometric shapes.

Figure 3:
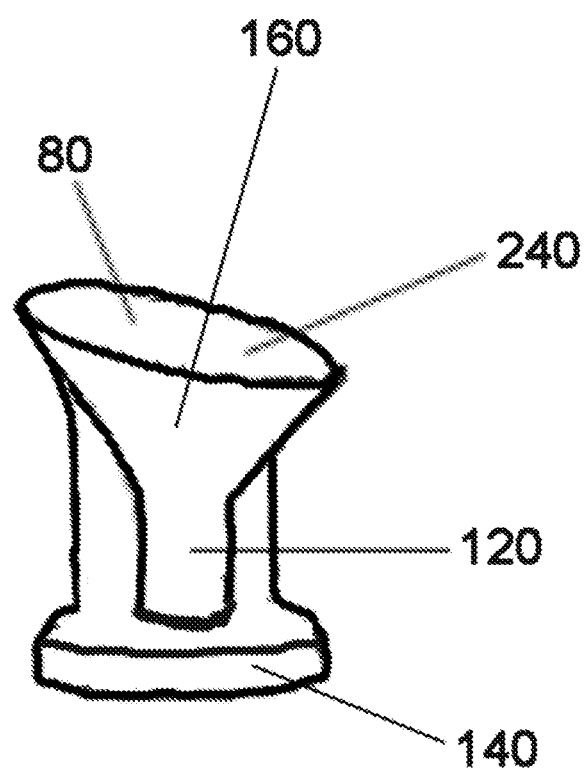
FIG. 3 is a detailed view of the cap assembly, of the embodiment of FIGS. 1 and 2, operatively connected as a one-piece construction having a disc member and a housing member.

With reference to FIG. 3, the apparatus 10' for stuffing confection of the present invention additionally comprises of a cap assembly 80. The cap assembly 80 is movably and/or removably disposed in covering relation to the enclosure 40 and in direct communicating relation with the hollow interior of the enclosure 40. The cap assembly 80 also comprises a disc member 140 and a housing member 120, wherein, both the disc member 140 and the housing member 120 may have an integral, one-piece construction. In an alternate embodiment, the disc member 140 and the housing member 120 may be removably connected to one another. In either of the above noted structural modifications, the housing member 120 of the cap assembly 80 includes a compartment 160 structured for containment of a stuffing material therein. The disc member 140 and the housing member 120 of the cap assembly 80 can be of numerous geometric shapes. As set forth above, the compartment 160 is disposed in communicating relationship with the interior of the enclosure 40, when it is in an operative covering position relative to the enclosure 40. The compartment 160 is dimensioned to include a predetermined quantity of the stuffing material, which should be sufficient in quantity to at least partially stuff and/or fill the interior of the confection, retained within the hollow interior of the enclosure 40.

Figures 4A, 4B, 4C, 4D:
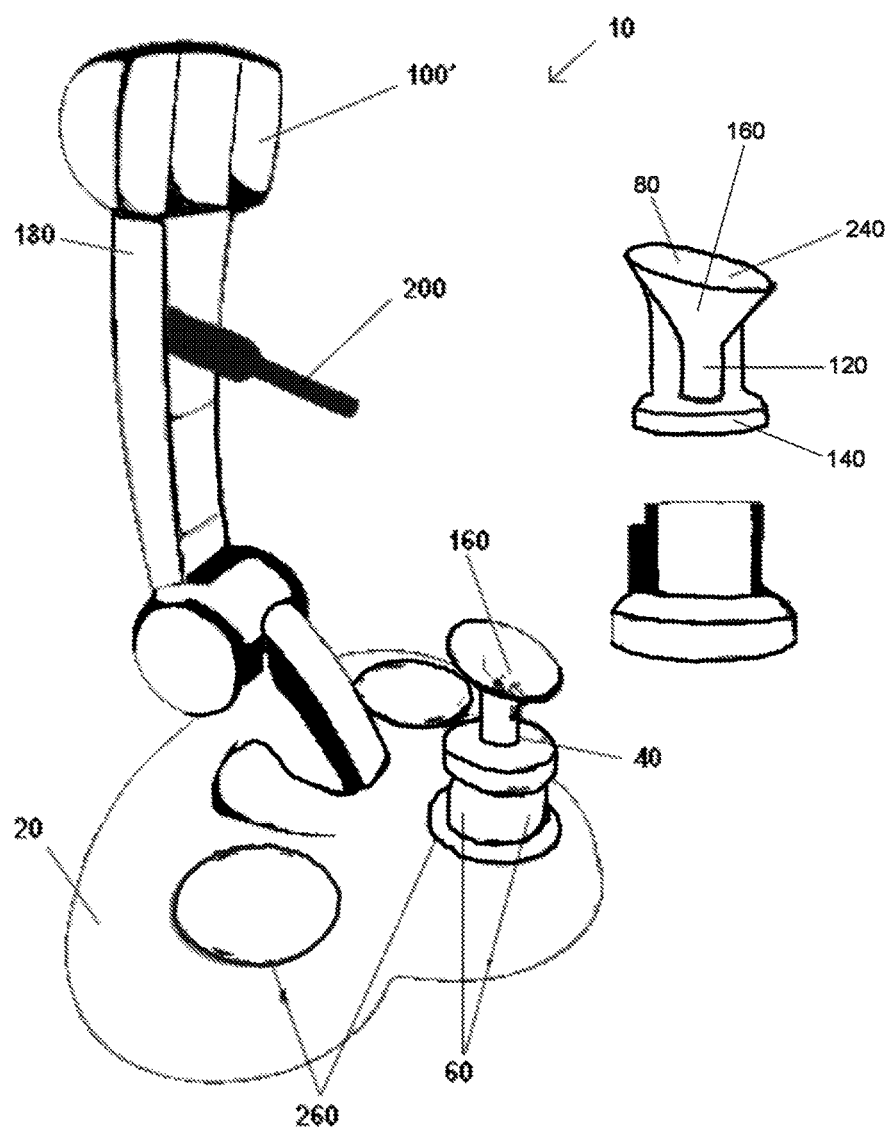
FIG. 4A is a perspective view of another embodiment of the apparatus for stuffing confections of the present invention operatively connected, having an enclosure connected to a pocket superimposed on a base member.
FIG. 4B is a detailed view of the plurality of pockets of the apparatus for stuffing confections of the present invention.
FIG. 4C is a detailed view of the plurality of wall members secured in a pocket.
FIG. 4D is a detailed view of the plurality of wall members in a closed orientation.

With primary reference to FIGS. 4A and 4B, the apparatus 10' for stuffing confection of the present invention comprises of a plurality of pockets 260. The plurality of pockets 260 are superimposed on the base member 20 extending at least partially there-through. Each or at least some of the plurality of pockets 260 include a single open end and is structured to facilitate a removable receipt and connection of said enclosure 40. The dimensions and the number of the pockets 260 can vary. The pockets 260 allow the enclosure 40 to fit securely within its dimensions. The flexibility of changing dimensions of the pockets 260 allows the user to use a variety of confections. It permits the user to change the dimensions of the enclosure 40 depending on the confection size. The plurality of pockets 260 permit a snap on relation between the enclosure 40 and each pocket 260, where the enclosure 40 can be temporarily or permanently snapped on within the pocket 260. The enclosure 40 can also be affixed to the pocket 260 in different ways and is not limited to being threaded on, glued on and fractioned on.

As a reference in FIG. 4E, in another embodiment, the cap assembly 80 of the apparatus 10' of the present invention comprises of a funnel member 240 and a housing member 120. The funnel member 240 and the housing member 120 comprise an integral, one-piece construction. The housing member 120 of the cap assembly 80 includes a compartment 160 structured for containment of the stuffing material. The compartment 160 is disposed in communicating relation with the enclosure 40, when in an operative position relative to the enclosure 40. The compartment 160 is dimensioned to include the stuffing material to at least partially fill the confection. The compartment 160 and the injection piston 200 are cooperatively dimensioned to facilitate a passage of the injection piston 200 into the compartment 160 in a driving relation to the stuffing material.

As a reference in FIG. 5A, as yet another embodiment, the cap assembly 80' of the apparatus 10, 10' of the present invention comprises of a housing member 120, a compartment 160' and a disc member 140, where the length of the compartment 160' substantially exceeds the length of the housing member 120, causing it to extend further past the length of the housing member 120 and the disc member 140 of the cap assembly 80'. The extended length of the compartment 160' allows the protruding compartment 160' to impregnate into the confectionary contained in the enclosure 40 below, further allowing the user to effectively stuff the stuffing material into the confectionary with relative ease.

Figure 2:
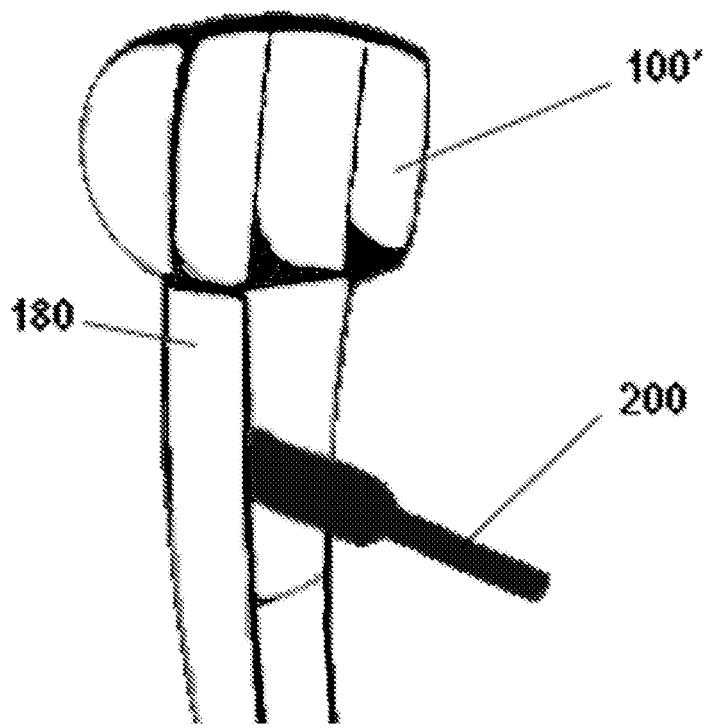
FIG. 2 is a detailed view of the injection member of the embodiment of FIG. 1 having a lever handle and an injection piston.

In order to accomplish an effective and efficient filling of the confection, the apparatus 10, 10' of the present invention additionally comprises an injection member generally indicated as 100, 100' as referenced in FIGS. 1, 2, and 4A. Moreover, as represented in at least FIGS. 1 and 2, the injection member 100, 100' comprises a lever handle 180 and as in FIGS. 1 and 4A, an injection piston 200. The injection piston 200 is movable relative to the cap assembly 80. Further, the injection piston 200 is movably and/or pivotally secured to the elongated lever handle 180, so as to move there with and relative thereto. The free or proximal end of the lever handle 180 may serve as a grip or like structure to facilitate a manual, semi-automated or fully automated movement as a means to position the lever handle 180 and the injection piston 200 into and out of interactive relationship with the cap assembly 80. The injection piston 200 and the compartment 160 are cooperatively dimensioned to facilitate a passage of the injection piston 200 into the compartment 160 in driving relation to the stuffing material. The injection piston 200 includes a length that is substantially equal to at least a majority of the length of the compartment 160. The injection piston 200 and the compartment 160 can also have a substantially equal lengths. The injection piston 200 can be made of plastic, metal, concrete and like materials. The injection piston 200 may also comprise a hollow or solid interior.

Additionally, in reference to FIGS. 1, 2 and 4A of the apparatus 10,10' of the present invention, the injection member 100, 100' is movably connected to the base member 20 and structured to position or force the stuffing material, which has been disposed within the compartment 160 of the housing member 120 of the cap assembly 80, into the enclosure. More specifically, the movement of the injection piston 200 of the injection member 100 will result in a driving relation of the injection piston 200 with the stuffing material, forcing it from the compartment 160 of the cap assembly 80 into the confection, which is being retained with the hollow interior of the enclosure 40. As indicated, the driving relation of the injection piston 200 relative to the stuffing material within the compartment 160 is accomplished by movement of the lever handle 180 of the injection member 100 in a generally downward direction towards the base member 20. Such movement of the lever handle 180 is facilitated by its pivotal interconnection to the base member 20 as a means to position the lever handle 180 and the injection piston 200 into and out of interactive relationship with the compartment 160 of the cap assembly 80. More particularly, the injection piston 200 can be disposed to move in different angles to flexibly accommodate a proper relation with the stuffing material in the compartment 160 of the cap assembly 80. Once the injection piston 200 is disposed in a desired position, the lever handle 180 may be gripped to negotiate a driving relation until the injection piston 200 is substantially facilitated to a pass through the compartment 160 of the housing member 120 and the disc member 140 of the cap assembly 80. This movement by the injection piston 200 may operate the stuffing material contained in the compartment 160 of the cap assembly 80 to movably interact with the confection disposed in the hollow interior of the enclosure 40. In another embodiment, the lever handle 180 may also negotiate an automated driving relation until the injection piston 200 is substantially facilitated to a pass through the compartment 160 of the housing member 120 and/or the disc member 140 of the cap assembly 80.

As referenced in FIG. 1, in yet another embodiment, the apparatus 10 for stuffing confection of the present invention also comprises a locking mechanism 220. The locking mechanism 220 is movably and pivotally connected to the base member 20. As a result, the locking mechanism 220 may be selectively disposed in a gripping, at least partially surrounding or other retaining relationship with the plurality of wall members 60 when they are disposed in surrounding and defining relation to the hollow interior of the enclosure 40. In addition, the locking mechanism 220 is dimensioned and configured to removably engage and thereby retain the cap assembly 80 when it is disposed in overlying, covering relation to the hollow interior of the enclosure 40. In the alternative, the locking mechanism 220 may be removably connected to the base member 20 and or the enclosure 40 and cap assembly 80 rather than being movably and/or pivotally connected to the base member 20, as set forth above. The locking mechanism 220 can be plastic, metal or like materials.

As referenced in FIG. 5 as yet another embodiment of the apparatus 10" of the present invention, the injection member 100" comprises a gripping member 280. The gripping member 280 facilitates a driving motion of the injection piston 200 into the compartment 160 of the cap assembly 80'. This driving motion forces the stuffing material in the compartment 160 of the cap assembly 80' into the hollow interior of the enclosure 40. The driving motion facilitated by the gripping member 280 can be manual or automated. The plurality of wall members 60 are immovable causing the enclosure 40 to be static or fixed. This means that the wall members 60 are not movably connected in this embodiment. The cap assembly 80' is removably disposed on the enclosure 40. However, the cap assembly 80' can be secured on the enclosure 40 using other methods like threading, pushing, forcing and gluing.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An apparatus for stuffing a confection with a stuffing material, said apparatus comprising:
   a base member,
   an enclosure connected to said base member having a hollow interior and disposed and dimensioned to receive a confection in the hollow interior,
   a cap assembly disposed in a communicating relation with the hollow interior of said enclosure,
   said cap assembly structured to retain the stuffing material therein, and
   an injection member comprising an injection piston movable relative to said cap assembly in a driving relation to the stuffing material,
   wherein the confection is positioned in the hollow interior, and the injection piston is moved towards the confection, through the cap assembly, forcing the stuffing material into the confection.

2. An apparatus for stuffing confection as recited in claim 1, wherein said base member comprises a plurality of pockets wherein said pockets are superimposed on said base member extending at least partially there-through.

3. An apparatus for stuffing confection as recited in claim 2, wherein each of said plurality of pockets include a single open end and is structured to facilitate a removable receipt and connection of said enclosure.

4. An apparatus for stuffing confection as recited in claim 1, wherein said enclosure comprises a plurality 1 of wall members disposed in a surrounding relation to and at least partially defining said hollow interior of said enclosure structured to be disposed within at least one of said plurality of pockets.

5. An apparatus for stuffing confection as recited in claim 4, wherein at least one of said wall members is movably connected to at least one of said plurality of pockets and positionable into and out of said surrounding relation to said hollow interior of said enclosure.

6. An apparatus for stuffing confection as recited in claim 5, wherein said hollow interior of said enclosure comprises a variable dimension dependent, at least in part, on the position of said at least one wall member relative to said hollow interior of said enclosure.

7. An apparatus for stuffing confection as recited in claim 1, wherein said cap assembly is removably disposed in a covering relation to said hollow interior of said enclosure.

8. An apparatus for stuffing confection as recited in claim 7, wherein said cap assembly structured in a locking and retaining relation to said enclosure.

9. An apparatus for stuffing confection as recited in claim 1, further comprising of a locking mechanism removably connected in retaining relation to said enclosure.

10. An apparatus for stuffing confection as recited in claim 9, wherein said locking mechanism pivotally disposed to secure said cap assembly with said plurality 1 of wall members.

11. An apparatus for stuffing a confection with a stuffing material, said apparatus comprising:
   a base member,
   an enclosure connected to said base member having a hollow interior and disposed and dimensioned to receive a confection in the hollow interior,
   said enclosure comprising of a plurality of wall members disposed in a surrounding relation to and at least partially defining the hollow interior of said enclosure,
   a cap assembly disposed in a communicating relation with said hollow interior of said enclosure,
   said cap assembly structured to retain the stuffing material therein, and
   an injection member comprising an injection piston movable relative to said cap assembly in a driving relation to the stuffing material,
   wherein the confection is positioned in the hollow interior, and the injection piston is moved towards the confection, through the cap assembly, forcing the stuffing material into the confection.

12. An apparatus for stuffing confection as recited in claim 11, wherein at least one of said wall members is removably connected to said base member and positionable into and out of said surrounding relation to said hollow interior of said enclosure.

13. An apparatus for stuffing confection as recited in claim 11, wherein said wall members are substantially concave in relation to said hollow interior thereof.

14. An apparatus for stuffing confection as recited in claim 11, wherein said injection member comprises a lever handle and an injection piston.

15. An apparatus for stuffing confection as recited in claim 14, wherein said injection member is disposed in a driving relation to said enclosure.

16. An apparatus for stuffing confection as recited in claim 11, wherein said cap assembly further comprises a funnel member and a housing member, said funnel member and said housing member comprise an integral, one-piece construction.

17. An apparatus for stuffing confection as recited in claim 16, wherein said housing member of said cap assembly includes a compartment structured for containment of the stuffing material.

18. An apparatus for stuffing confection as recited in claim 17, wherein said compartment is disposed in communicating relation with said enclosure, when in an operative position relative to said enclosure.

19. An apparatus for stuffing confection as recited in claim 18, wherein said compartment is dimensioned to include the stuffing material to at least partially fill said confection.

20. An apparatus for stuffing confection as recited in claim 18, wherein said compartment and said injection piston are cooperatively dimensioned to facilitate a passage of said injection piston into said compartment in a driving relation to the stuffing material.

21. An apparatus for stuffing confection as recited in claim 20, wherein said injection piston has a length substantially equal to at least a majority of a length of 1 said compartment.

22. An apparatus for stuffing confection as recited in claim 21, wherein said injection piston and said compartment are substantially equal lengths.

23. An apparatus for stuffing a confection with a stuffing material, said apparatus comprising:
   an enclosure having a hollow interior disposed and dimensioned to receive a confection therein,
   a cap assembly disposed in a communicating relation with the hollow interior of said enclosure, said cap assembly structured to retain the stuffing material therein, and
   an injection member comprising an injection piston movable relative to said cap assembly in a driving relation to the stuffing material,
   wherein the confection is positioned in the hollow interior, and the injection piston is moved towards the confection, through the cap assembly, forcing the stuffing material into the confection.

24. An apparatus for stuffing confection as recited in claim 23, wherein said injection piston and said enclosure are substantially equal lengths.

25. An apparatus for stuffing confection as recited in claim 23, wherein said enclosure further comprises a plurality of wall members in a surrounding relation to and at least partially defining said hollow interior 1 of said enclosure.

26. An apparatus for stuffing confection as recited in claim 23, wherein said cap assembly is removably disposed in a covering relation to said hollow interior of said enclosure.

27. An apparatus for stuffing confection as recited in claim 26 wherein said cap assembly comprises a disc member and a housing member, said disc member and said housing member comprise an integral, one-piece construction.

28. An apparatus for stuffing confection as recited in claim 27 wherein said housing member comprises a compartment to facilitate the storage of the stuffing material therein.

29. An apparatus for stuffing confection as recited in claim 28, wherein said compartment is disposed in said communicating relation with said enclosure, when in an operative position relative to said enclosure.

30. An apparatus for stuffing confection as recited in claim 28, wherein said compartment is dimensioned to include the stuffing material in sufficient quantity to at least partially fill the confection.

31. An apparatus for stuffing confection as recited in claim 28, wherein said compartment and said injection piston are cooperatively dimensioned to facilitate a passage of said injection piston into said compartment in said driving 1 relation to the stuffing material.

32. An apparatus for stuffing confection as recited in claim 31,
   wherein said compartment has a length substantially greater than at least a majority of a length of said housing member.

33. An apparatus for stuffing confection as recited in claim 28, wherein said injection piston has a length substantially equal to at least a majority of length of said compartment.

34. An apparatus for stuffing confection as recited in claim 28, wherein said injection piston and said compartment are substantially equal lengths.

35. An apparatus for stuffing confection as recited in claim 23, wherein said cap assembly is disposed in a removably, locking relation to said enclosure.

36. An apparatus for stuffing confection as recited in claim 23, wherein said injection member further comprises a gripping member structured to facilitate manual positioning of said injection member into said driving relation.

\* \* \* \* \*